United States Patent
Baldinger et al.

(10) Patent No.: US 7,135,051 B2
(45) Date of Patent: Nov. 14, 2006

(54) DIRT CUP FILTER WITH PRE-FILTRATION CAP

(76) Inventors: Russell L. Baldinger, 11988 Main St., Adelphi, OH (US) 43101; Danny Lamer, 961 Juge Allard, Berthierville Quebec (CA) J0K 1A0

( * ) Notice: Subject to any disclaimer, the term of this patent is extended or adjusted under 35 U.S.C. 154(b) by 109 days.

(21) Appl. No.: 10/861,042

(22) Filed: Jun. 4, 2004

(65) Prior Publication Data

US 2004/0261382 A1 Dec. 30, 2004

Related U.S. Application Data

(60) Provisional application No. 60/476,253, filed on Jun. 5, 2003.

(51) Int. Cl.
*B01D 35/30* (2006.01)
(52) U.S. Cl. ............... 55/337; 55/413; 55/426; 55/459.1; 55/DIG. 3; 55/482; 55/486; 55/487; 55/498; 55/501; 55/505; 55/510; 55/521; 55/529; 15/347; 15/352; 15/353
(58) Field of Classification Search .............. 55/337, 55/413, 426, 459.1, DIG. 3, 482, 486, 487, 55/498, 510, 501, 505, 521, 529; 15/353, 15/352, 347
See application file for complete search history.

(56) References Cited

U.S. PATENT DOCUMENTS

| | | | | | |
|---|---|---|---|---|---|
| 3,653,189 | A | * | 4/1972 | Miyake et al. | 55/288 |
| 5,248,323 | A | * | 9/1993 | Stevenson | 95/90 |
| 5,800,741 | A | | 9/1998 | Glenn et al. | |
| 6,010,550 | A | * | 1/2000 | Song | 55/482 |
| D437,983 | S | | 2/2001 | Stratford | |
| 6,306,199 | B1 | * | 10/2001 | Gustafson et al. | 95/226 |
| 6,558,453 | B1 | * | 5/2003 | Sepke et al. | 95/268 |
| 6,565,637 | B1 | * | 5/2003 | Alberts, III et al. | 96/333 |
| 6,599,338 | B1 | * | 7/2003 | Oh et al. | 55/337 |
| 6,660,053 | B1 | * | 12/2003 | Oh et al. | 55/337 |
| 6,757,933 | B1 | * | 7/2004 | Oh et al. | 15/353 |
| 6,913,635 | B1 | * | 7/2005 | Yoo et al. | 55/476 |
| 6,948,212 | B1 | * | 9/2005 | Oh et al. | 15/328 |
| 2004/0003719 | A1 | * | 1/2004 | Le et al. | 95/287 |

* cited by examiner

*Primary Examiner*—Duane Smith
*Assistant Examiner*—Minh-Chau T. Pham
(74) *Attorney, Agent, or Firm*—Jason H. Foster; Kremblas, Foster, Phillips & Pollick (57) ABSTRACT

A dual-stage vacuum cleaner filter with a pre-filtration cap having pre-filtering screens. A base with an aperture and a filter media strip pleated in the shape of a frustocone can be mounted within the dirt cup of a handheld vacuum. A circular, planar gas impermeable lid is sealingly fixed at the end of the filter media strip opposite the base. The cap is removably mounted to the base covering the filter media strip and lid. The cap has sidewall and endwall pre-filtering screens, and when the sidewall screens become loaded with debris, the endwall screen permits air to flow through a gap between the cap and the lid to the filter media strip.

24 Claims, 8 Drawing Sheets

DIRT CUP FILTER WITH PRE-FILTRATION CAP

CROSS-REFERENCES TO RELATED APPLICATIONS

This application claims the benefit of U.S. Provisional Application No. 60/476,253 filed Jun. 5, 2003.

STATEMENT REGARDING FEDERALLY-SPONSORED RESEARCH AND DEVELOPMENT (Not Applicable)

REFERENCE TO AN APPENDIX (Not Applicable)

BACKGROUND OF THE INVENTION

1. Field of the Invention

This invention relates generally to handheld vacuum cleaners, and more particularly to a dirt-cup type filter for a handheld vacuum cleaner.

2. Description of the Related Art

In the vacuum cleaner art, distinctions are made between handheld and upright vacuum cleaners. Upright vacuums are normally large devices that rest upon the floor at all times and are moved by rolling. Uprights are too heavy to be lifted easily. Handheld vacuums, on the contrary, are designed to be lifted and carried easily by an operator to sweep stairs, shelves, windowsills, and other surfaces above the ground.

The typical filters used in upright vacuum cleaners include bags and dirt cup filters. Bags are made of sheets of filtration material sewn or otherwise joined together near an opening through which air is drawn from the area being vacuumed. Dirt cup filters are cylindrical or frustoconical "cups" that have filtration material around the curved sidewall. Some dirt cup filters have HEPA rated filter material, which has very fine pores, and therefore the loading of the filter with large debris can significantly decrease the life of the filter.

Dirt cup filters are often used with upright vacuums that take advantage of cyclonic action, to reduce the loading of the filter with large debris. Cyclonic action is a principle in which dirty air swirls around in a chamber before passing through a filter to allow particles to settle out during the swirling action.

Handheld vacuum cleaners typically use bag filters, because they are not always oriented in a way which enables them to take advantage of cyclonic action. Furthermore, there is rarely enough space in a small handheld vacuum cleaner to accommodate the large chamber needed for cyclonic action of the air/debris combination.

Therefore, the need exists in handheld vacuum cleaners for a filter that has a long life due to a configuration that prevents it from getting loaded with large debris too rapidly.

BRIEF SUMMARY OF THE INVENTION

The invention is a filter for removing particulate from a gas stream flowing through a debris collecting chamber of a vacuum cleaner. The filter includes a base having an aperture through which the gas stream can flow. A filter media strip, having first and second lateral edges, mounts to the base. The first lateral edge sealingly mounts to the base around the base aperture, thereby forming an outwardly facing surface on the filter media strip. The filter media strip has pores of a predetermined size for permitting gas to flow through the filter media strip.

A substantially gas impermeable lid is sealingly mounted to the second lateral edge of the filter media strip. Thus, the filter media strip is interposed between the lid and the base.

A cap, having a sidewall with a first end and an opposite second end, is mounted to the base at the second end. The sidewall has at least one pre-filtering porous panel. The pre-filtering panel is spaced from the outwardly facing surface of the filter media strip. A first gas pathway is formed extending from openings in the sidewall's pre-filtering panel through the pores in the filter media strip to the base aperture.

The cap endwall extends across the sidewall at the first sidewall end. The endwall has at least one pre-filtering porous panel spaced from the gas impermeable lid. A second gas pathway is formed extending from openings in the endwall's pre-filtering porous panel through a gap between the lid and the cap and through the pores in the filter media strip to the base aperture. The openings in the pre-filtering porous panels are substantially larger than the pores in the filter media strip.

BRIEF DESCRIPTION OF THE SEVERAL VIEWS OF THE DRAWINGS

FIG. 2 is an exploded view in perspective illustrating the present invention.

FIG. 5 is a frontal view in perspective illustrating the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or term similar thereto are often used. They are not limited to direct connection, but include connection through other elements where such connection is recognized as being equivalent by those skilled in the art.

DETAILED DESCRIPTION OF THE INVENTION

Figure 2:
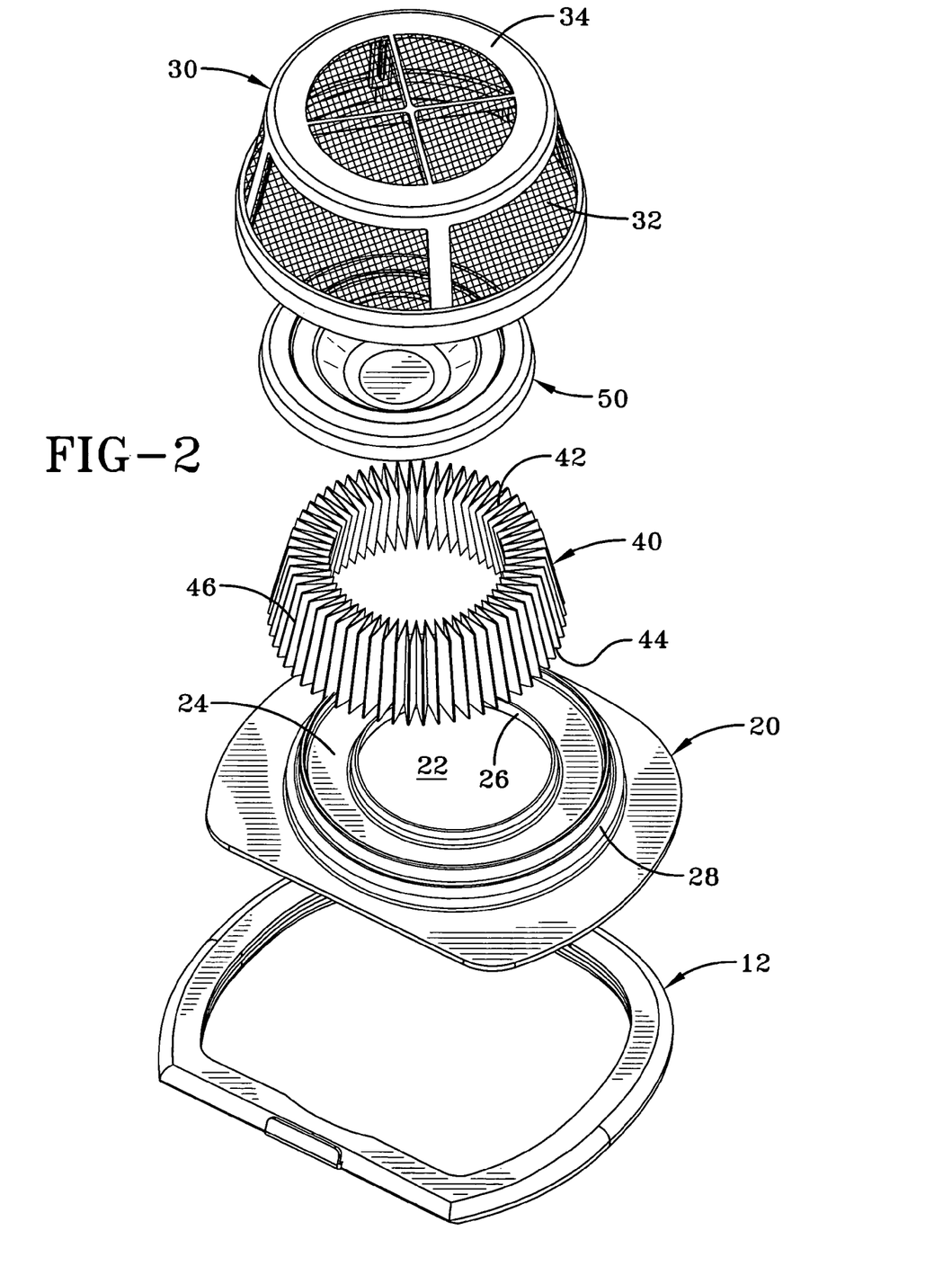

The preferred embodiment of the filter 10 is shown in an exploded view in FIG. 2 having, generally, a base 20 and a cap 30. A filter media strip 40 is interposed between the base 20 and a lid 50. The cap 30 mounts, preferably in a manner that permits it to be removed, over the filter media strip 40 and the lid 50, and attaches to the base 20.

Looking now to the invention and its operation in detail, the base 20 and the lid 50 are preferably made of a gas-impermeable material, such as ABS, but could be made of any other known polymer materials or a metal, composite or ceramic. The base 20 preferably has an aperture 22 formed through it, as defined by an internal edge 26, through which gas can flow. The base aperture 22, which, for example, can be approximately two and one-quarter inches in diameter, has an axis which, in the preferred embodiment, is substantially perpendicular to a plane that contains the base 20. With the exception of the aperture 22, gas cannot flow through the base 20 between its peripheral edges. The lid 50 preferably has no apertures, and therefore, no gas can pass through the lid 50 between its peripheral edges. An exemplary lid 50 diameter is about three inches.

The filter media strip 40 is made of a porous media, such as PTFE, paper, woven or non-woven fibers, or other filtration material that has fine pores to permit the passage of gas, such as air, but not the passage of particles larger than the pores. The pores of the filter media strip 40 are within a predetermined size range, and permit the flow of air, but block the flow of a known percentage of particles larger than a predetermined size. Particles larger than the pores are filtered out in a conventional manner by seating within the pores or on the surface of the filter media strip 40 that faces the oncoming gas stream. An exemplary filter media strip material blocks 99.97 percent of all particles 0.3 micron or larger at a flow rate of several feet per minute or more. The filter media strip 40 can preferably be regenerated, meaning that it can be cleaned, such as by blasting with compressed air, washing with water or mechanically rapping the filter, to remove most of the particles lodged in the pores.

The filter media strip 40 is preferably pleated and deformed into a closed loop having an upper lateral edge 42, a lower lateral edge 44 and a radially outwardly facing surface 46. In the preferred embodiment, the pleated filter media strip forms a frustocone, but could alternatively be cylindrical, such as a circular cylinder as shown by the filter media strip 240 in the filter 200 of FIG. 9, a rectangular cylinder or any other shape of cylinder. An exemplary length for the filter media strip 40 is approximately one inch, and an exemplary diameter is about three inches.

The lower edge 44 is preferably sealingly mounted in the groove 24 formed in the base 20, such as by an adhesive poured or injected into the groove 24 to adhere to the filter media strip 40 and the base 20. The upper edge 42 is preferably sealingly mounted to the lid 50 in a groove formed therein, such as by an adhesive that adheres to the filter media strip 40 and the lid 50.

It can be seen that the combination of the base 20, the filter media strip 40 and the lid 50 forms a frustoconical filter through which gases, such as air, can pass. In the preferred embodiment, air flows by striking the radially outwardly facing surface 46, passing through the pores into the interior of the filter media strip 40 and out the base aperture 22. Thus, the structure permits gas flow along the path described, but prohibits flow through the lid 50 and the base 20 (other than the base aperture 22).

Figure 9:
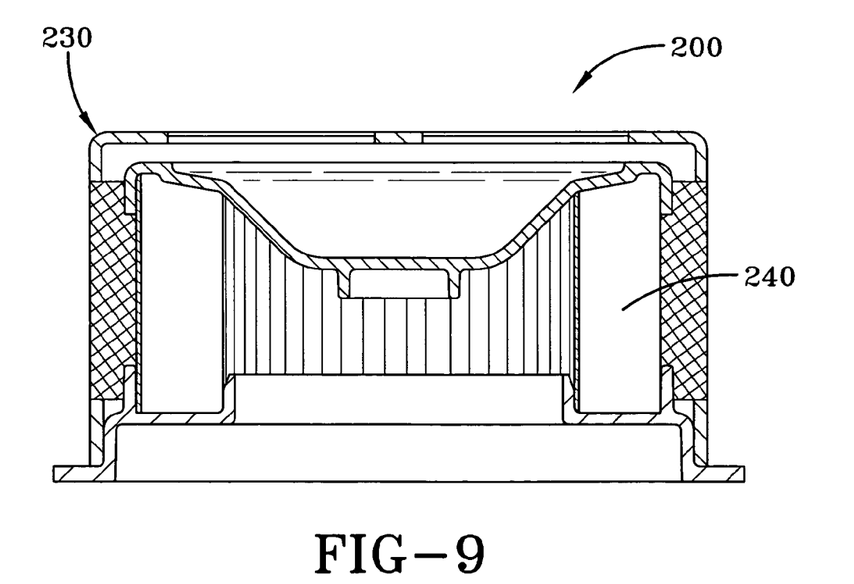
FIG. 9 is a side view in section illustrating an alternative embodiment of the present invention.

The cap 30 is mounted over the base 20, and has a sidewall 32 and an endwall 34. The sidewall is preferably of the same general shape as the filter media strip 40, although larger to fit over the strip 40, and therefore in the preferred embodiment is also frustoconical. The alternative cap 230, shown in FIG. 9, is cylindrical. The endwall 34 is preferably substantially planar and is transverse to the sidewall 32. The cap 30 can be made of polypropylene or any other suitable material.

The sidewall 32 and endwall 34 are supported by the relatively rigid axial frame members 36, the circumferential frame member 37 and the radial frame members 38. In the embodiment shown in FIGS. 1 and 2, there are four pre-filtering, porous panels 33 in the sidewall 32 spanning between the frame members 36, and four pre-filtering porous panels 35 in the endwall 34, spanning between the frame members 37 and 38. The pre-filtering porous panels 33 and 35 are screen material in the preferred embodiment having, for example, 38 openings per square inch. Of course, there are numerous other porous materials with numerous other pore sizes that could be used. Additionally, there could be more or fewer than four of each pre-filtering porous panels. The number, type and pore size of each pre-filtering panel is not considered critical to the invention, although it will be appreciated that the preferred structure has advantages over alternative structures. As described below, the pore size of the pre-filtering panels 33 and 35 relative to the pore size of the filter media strip 40 is critical.

The cap 30 has a radially inwardly facing lip at the end of the sidewall 32 opposite the endwall 34, and the lip seats against the radially outwardly facing shoulder 28 formed on the base 20. A friction fit removably fastens the cap 30 to the base 20, thereby sealing gas from flowing between the radially inwardly facing lip of the cap 30 and the shoulder 28 of the base 20. Of course, some gas may flow through this interface, but any gap formed at this interface is preferably not larger than the largest opening in the pre-filtering porous panels for reasons that will be apparent from the instant description to a person having ordinary skill in the filtration art.

Figure 6:
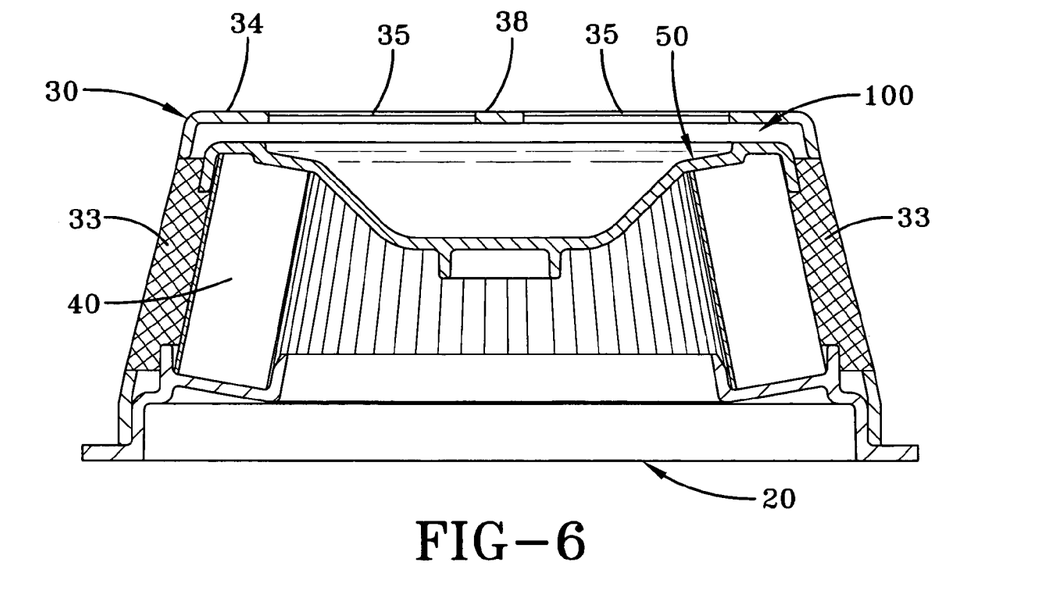
FIG. 6 is a side view in section through the lines 6—6 of FIG. 1.

There is a gap 100 between the inwardly facing surface of the cap 30 and the outwardly facing surface of the lid 50 as shown in FIG. 6. The gap 100 extends substantially entirely around the periphery of the lid 50, and is large enough to permit air to pass through the gap 100 without any substantial resistance to flow; that is, the gap 100 is not a capillary passage or metering orifice. Thus, air can pass through the pre-filtering panels 35 in the endwall 34 of the cap 30, flow through the gap 100 around the periphery of the lid 50, and then through the filter media strip 40 between the lid 50 and the base 20.

Figure 1:
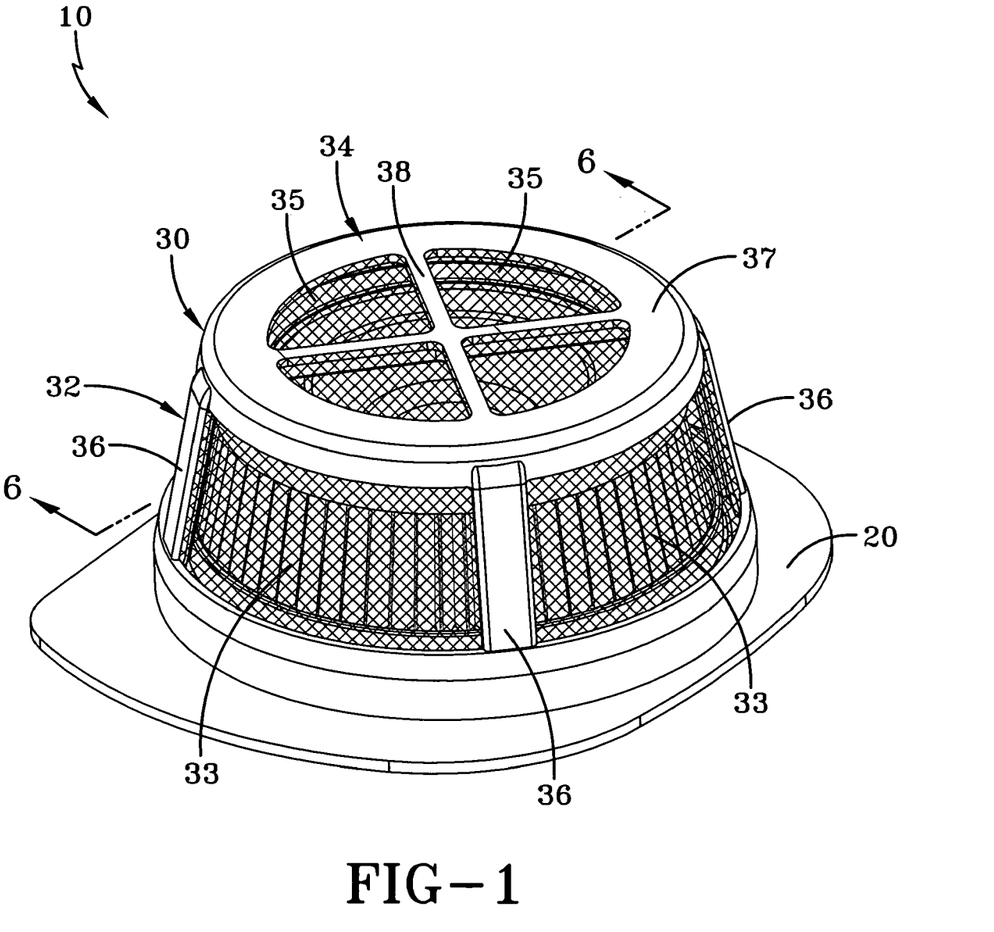
FIG. 1 is a frontal view in perspective illustrating the preferred embodiment of the present invention.
Figure 3:
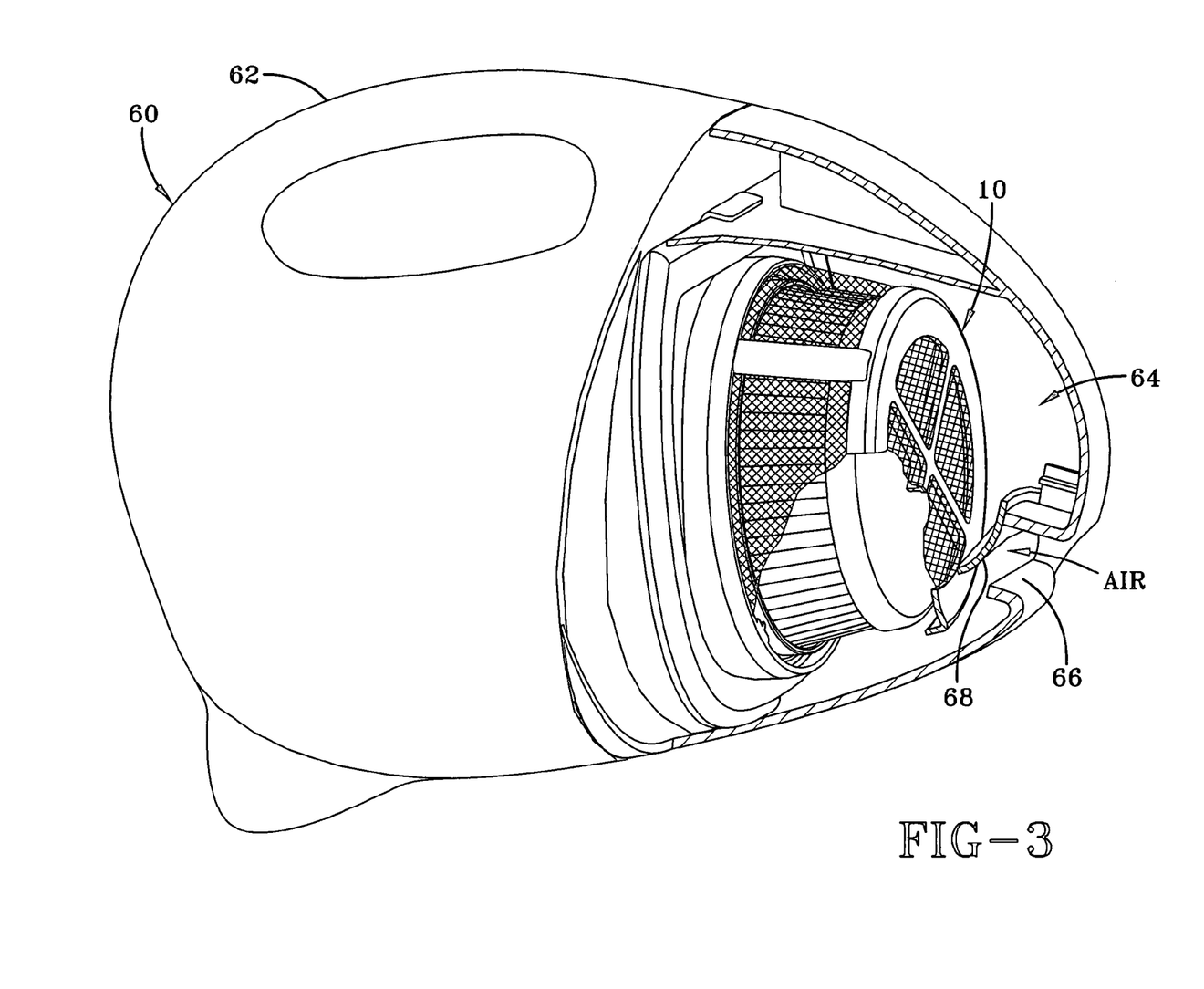
FIG. 3 is a side view in perspective illustrating a cutaway view of a vacuum cleaner with the present invention installed in an operable position, and a portion of the present invention is removed to disclose the underlying structure.

When the cap 30 is mounted to the base 20, the combination has the appearance shown in FIG. 1. This structure is preferably adapted to be mounted into a vacuum cleaner, such as the conventional handheld vacuum 60 shown in FIGS. 3 and 8. The vacuum 60 contains a motor combined with an impeller 69 that is mounted over an opening 70 into a chamber known in the art as a dust cup 64. The filter 10 is placed over the opening 70 that extends between the motor housing 62 and the dust cup 64, preferably with a gasket 12 (see FIGS. 2 and 8) that prevents air from passing around the base 20. The dust cup 64 has a second opening 66 that opens to the environment, but is closed against the outward flow of gas or particles by a flap 68 that hinges inwardly. A hose or other adapter can be mounted in the opening 66.

Figure 4:
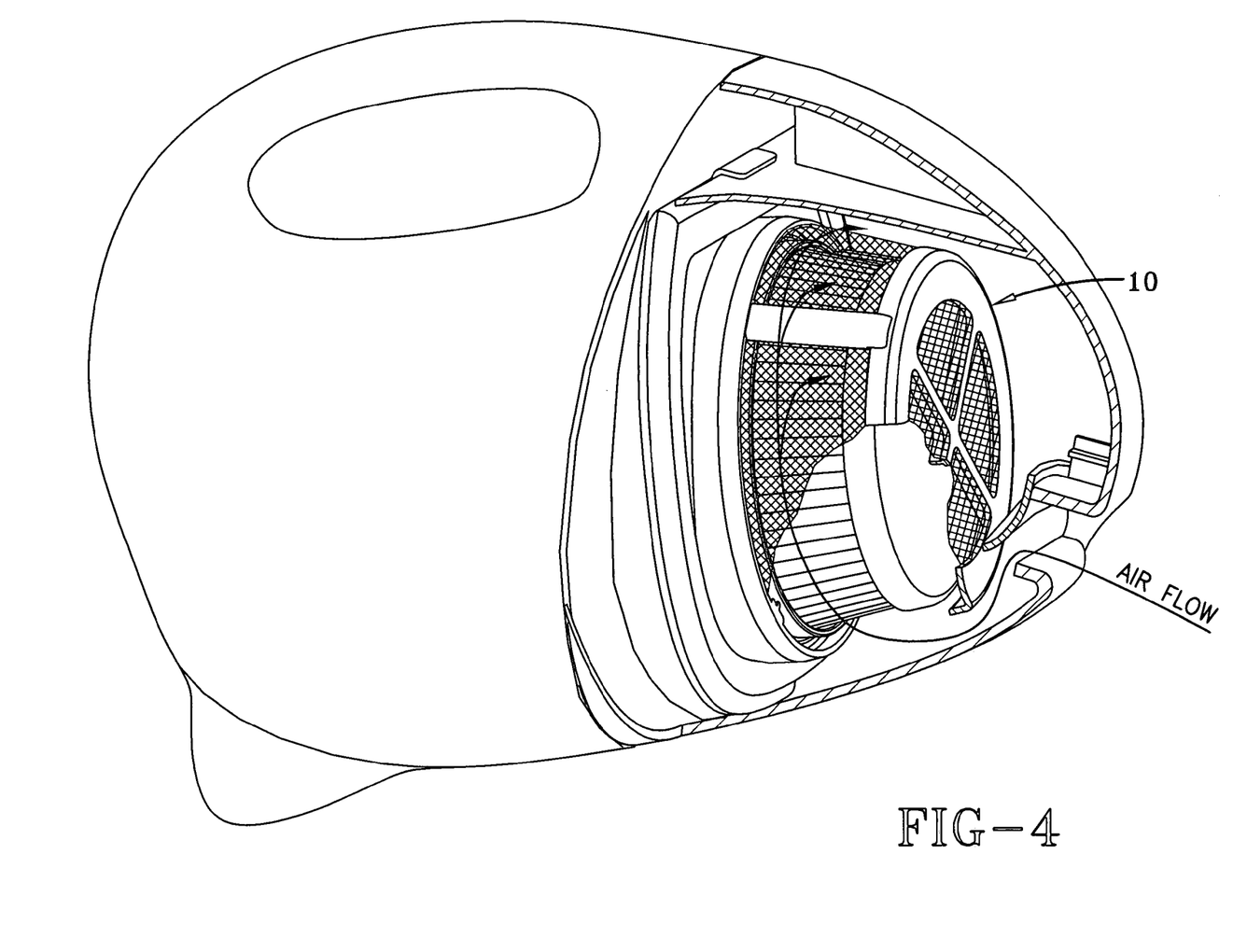
FIG. 4 is a side view in perspective illustrating a cutaway view of a vacuum cleaner with the present invention installed in an operable position, and a portion of the present invention is removed to disclose the underlying structure.
Figure 8:
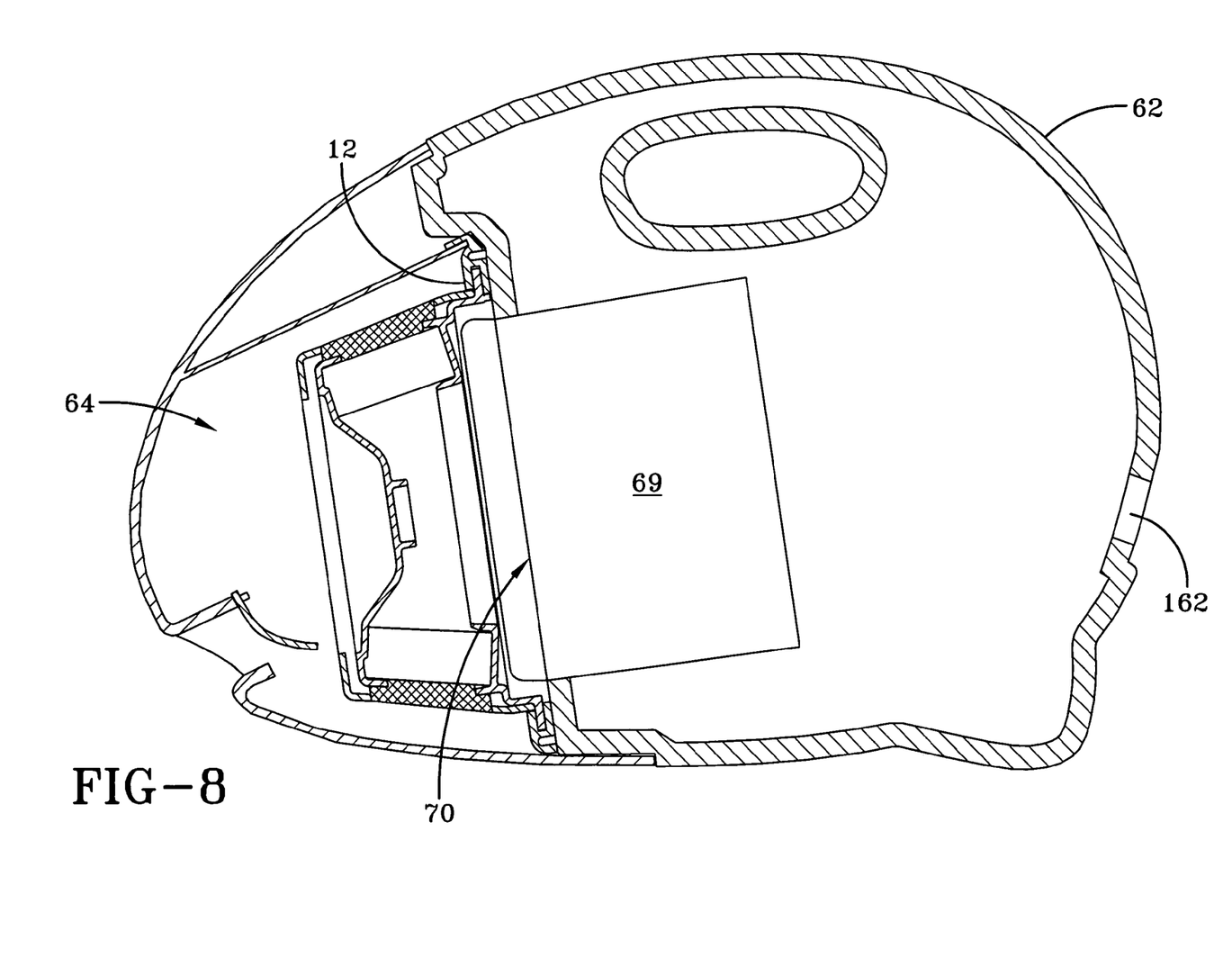
FIG. 8 is a schematic side view in section illustrating the placement of the preferred embodiment relative to the other parts of a vacuum.

During operation, the motor and impeller combination 69 creates a negative pressure in the dust cup 64. Air is drawn in through the opening 66 by incoming air moving the flap 68 inwardly as shown in FIG. 4. The air drawn into the dust cup 64 flows primarily circumferentially around and through the filter 10 that is mounted between the opening 66 and the opening 70. The air flows circumferentially around the filter 10 due to the circular shapes of the filter 10 and the dust cup 64. The air exits the housing 62 though a conventional outlet 162 (FIG. 8).

Figure 5:
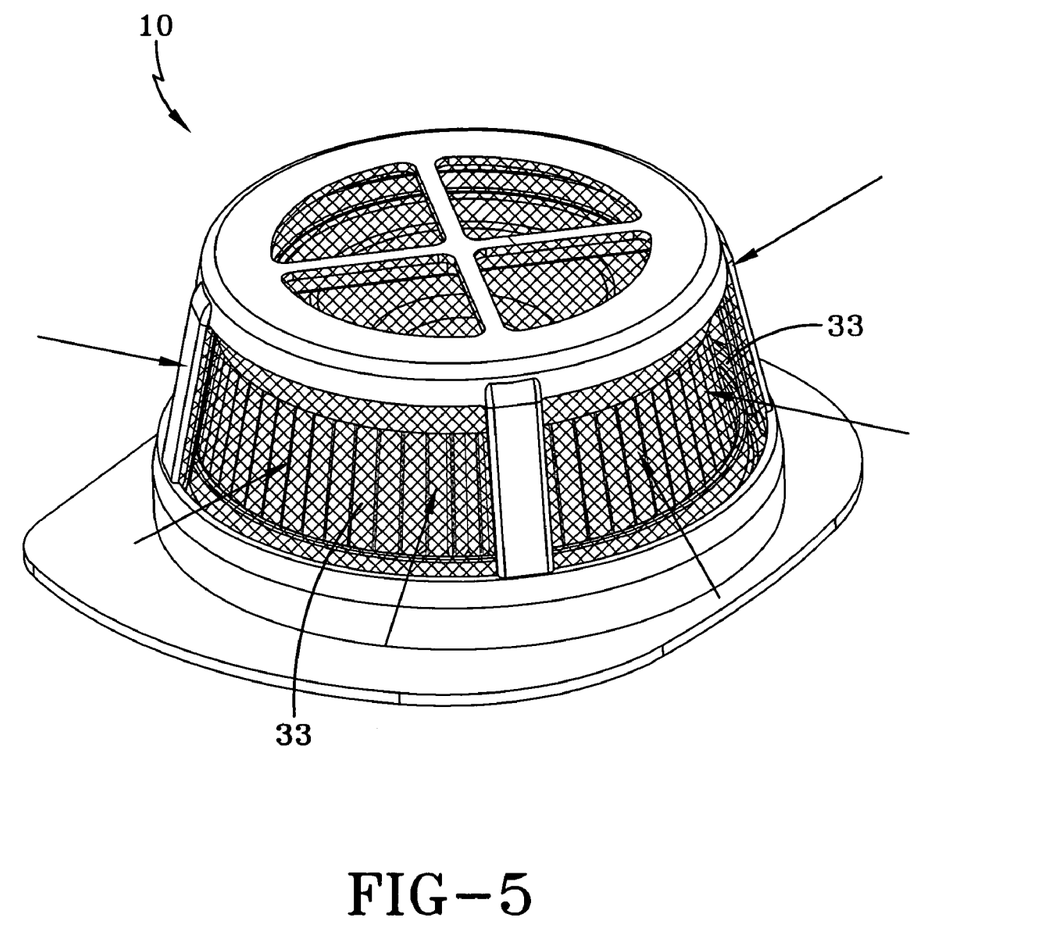

When the filter 10 is new, air flowing through the filter 10 as described above first flows primarily through the openings in the pre-filtering panels 33 on the sidewall 32, through the filter media strip 40 as shown in FIG. 5 and then out of the base aperture 22. This is the primary gas path due to the flow of air around the periphery of the filter 10, and due to the close proximity of the pre-filtering panels 33 to the filter media strip 40.

Some air also passes through the pre-filtering panels 35 in the endwall 34 and then through the gap 100 before passing through the filter media strip 40 and base aperture 22. This is the second gas pathway, which extends from the openings in the pre-filtering panels 35, through the gap 100, through the filter media strip 40 and through the base aperture 22.

The first gas pathway is shorter than the second, and is along the path that air tends to flow in the cylindrical dirt cup 64 and around the circular filter 10 as shown in FIG. 4. Thus, more air will flow through the first gas pathway than the second when the filter 10 is new.

When air passes through the filter 10, some debris that is vacuumed will not be able to pass through the pre-filtering panels 33 and 35 due to the size of the debris relative to the openings in the panels. This is expected, because the intended purpose of the pre-filtering panels 33 and 35 is to prevent large debris from clogging the smaller pores of the filter media strip 40. The larger debris will seat against the outwardly facing surface of the pre-filtering panels 33, and will remain there when the vacuum is shut off, or fall away into the dust cup 64 in the absence of air flowing through the filter 10.

The air flowing between the pre-filtering panels 33 and the filter media strip 40 will, having been pre-filtered, be less laden with particulate. This pre-filtered air will then flow through the filter media strip 40, but will load the strip 40 less rapidly with particulate than would be the case without the pre-filtering panels 33. By pre-filtering the air passing through the dust cup 64, the filter 10 functions as a dual stage filter that keeps larger debris from loading the smaller pores in the filter media strip 40. The openings in the pre-filtering panels 33 and 35 are small enough to permit only the smallest of household particles to pass through, but not so small that the air flow that is needed for the filter media strip 40 to perform is significantly hindered.

Figure 7:
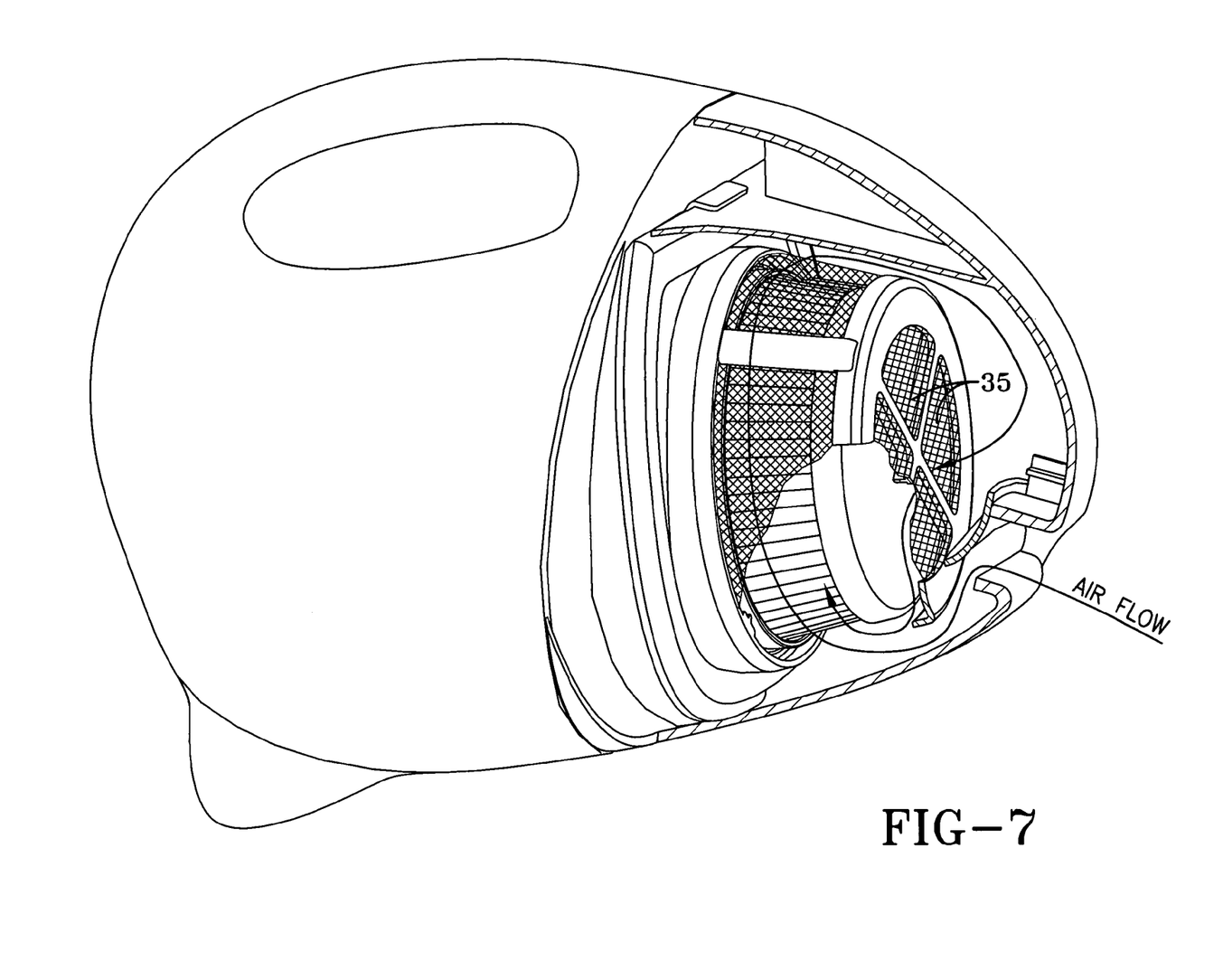
FIG. 7 is a side view in section illustrating the present invention with the sidewall pre-filtering panels loaded with debris and the flow of air through the endwall pre-filtering panels.

Debris remaining on the pre-filtering panels 33 restricts the passage of air or smaller debris through the pre-filtering panels 33, and thus along the first gas pathway. As the amount of debris restricting the flow of air through the pre-filtering panels 33 increases, the resistance to the flow of air through the first gas pathway increases. As this resistance increases, more air flows through the lower resistance pre-filtering panels 35 in the endwall 34 of the cap 30, which are part of the second gas pathway. This is illustrated in FIG. 7, in which the sidewall is shown loaded with debris that significantly restricts the flow of air through the sidewall's pre-filtering panels, and therefore the flow of air increases through the pre-filtering panels 35 in the endwall.

The air flowing through the pre-filtering panels 35 continues to be pre-filtered in the same way the air was pre-filtered when it flowed through the pre-filtering panels 33. The pre-filtering panels 35 in the endwall 34 therefore provide a second set of pre-filtering panels to extend the life of the filter 10 beyond that of a pre-filter only in the sidewall. Once the pre-filtering panels, the filter media strip, or both, of the filter 10 are loaded completely, the filter 10 is removed from the vacuum, cleaned, and re-used, or it is discarded and replaced.

The pre-filtering panels 33 and 35 have a pore size that is larger than the pore size of the filter media strip 40. The relative difference in the pore sizes may be very large, such as a difference of multiple orders of magnitude, or it may be smaller, such as a difference of a few percent. The relative difference permits pre-filtering at both the endwall and the sidewall, thereby providing a longer lasting filter 10.

It is possible to have endwall pre-filtering panels with one pore size and sidewall pre-filtering panels with a different pore size. However, this is not preferred.

While certain preferred embodiments of the present invention have been disclosed in detail, it is to be understood that various modifications may be adopted without departing from the spirit of the invention or scope of the following claims.

The invention claimed is:

1. A filter for removing particulate from a gas stream flowing through a debris collecting chamber of a vacuum cleaner, the filter comprising:
   a) a base having an aperture through which the gas stream can flow;
   b) a filter media strip having opposing first and second lateral edges, the first lateral edge sealingly mounted to the base around the base aperture forming an outwardly facing surface on the filter media strip, said filter media strip having pores of a predetermined size for permitting gas to flow through;
   c) a substantially gas impermeable lid sealingly mounted to the second lateral edge of the filter media strip and spaced from the base with the filter media strip interposed between the lid and the base; and
   d) a cap comprising:
      i. a sidewall having a first end and an opposite second end mounted to the base, the sidewall having at least one pre-filtering porous panel spaced from the outwardly facing surface of the filter media strip, thereby forming a first gas pathway extending from openings formed in the sidewall's pre-filtering porous panel through the pores in the filter media strip to the base aperture;
      ii. a cap endwall extending across the sidewall at the first end, said endwall having at least one pre-filtering porous panel spaced from the gas impermeable lid, thereby forming a second gas pathway extending from openings formed in the endwall's pre-filtering porous panel through the pores in the filter media strip to the base aperture; and
      iii. wherein the openings in the pre-filtering porous panels are substantially larger than the pores in the filter media strip.

2. The filter in accordance with claim 1, wherein the cap is removably mounted to the base.

3. The filter in accordance with claim 1, wherein the filter media strip is curved around the base aperture forming a substantial cylinder.

4. The filter in accordance with claim 3, wherein the cap sidewall is substantially cylindrical.

5. The filter in accordance with claim 4, wherein the cap endwall is substantially planar, substantially parallel to the lid and substantially perpendicular to a cap sidewall axis, and wherein the second gas pathway extends through a gap formed between the lid and the cap endwall.

6. The filter in accordance with claim 5, wherein the pre-filtering porous panels comprise screens with mesh size of about 38 openings per square inch.

7. The filter in accordance with claim 5, wherein the filter media strip is pleated.

8. The filter in accordance with claim 7, wherein the cap sidewall's pre-filtering panel is substantially perpendicular to the endwall's pre-filtering panel.

9. The filter in accordance with claim 1, wherein the filter media strip is curved around the base aperture forming a substantial frustocone.

10. The filter in accordance with claim 9, wherein the cap sidewall is substantially frustoconical.

11. The filter in accordance with claim 10, wherein the cap endwall is substantially planar, substantially parallel to the lid and substantially perpendicular to the axis of the cap sidewall, and wherein the second gas pathway extends through a gap formed between the lid and the cap endwall.

12. The filter in accordance with claim 11, wherein the pre-filtering porous panels comprise screens with mesh size of about 38 openings per square inch.

13. The filter in accordance with claim 11, wherein the filter media strip is pleated.

14. The filter in accordance with claim 13, wherein the cap sidewall's pre-filtering panel is transverse to the endwall's pre-filtering panel.

15. A filter for removing particulate from a gas stream flowing through a dirt collecting chamber of a vacuum cleaner, the filter comprising:
  a) a substantially gas-impermeable base having an aperture through which the gas stream can flow, said aperture having an axis;
  b) a filter media strip having opposing first and second lateral edges, the first lateral edge sealingly mounted to and curved around the base aperture, thereby forming an outwardly facing, substantially frustoconical surface on the filter media strip having an axis that is substantially coaxial with the aperture axis, said filter media having a predetermined "pore size" for permitting the gas stream to flow through;
  c) a substantially gas impermeable lid sealingly mounted to the second lateral edge of the filter media strip and spaced from the base with the filter media strip interposed between the lid and the base for permitting the gas stream to flow through the filter media strip and then through the base aperture; and
  d) a cap sealingly mounted to the base and extending over the filter media strip and the lid, the cap comprising:
    i. a substantially frustoconical sidewall substantially coaxial with the filter media strip, the sidewall having a first end and an opposite second end mounted to the base, the sidewall also having at least one pre-filtering porous panel spaced from the outwardly facing surface of the filter media strip, thereby forming a first gas pathway from openings formed in the sidewall's pre-filtering porous panel through the pores formed in the filter media strip to the base aperture;
    ii. a substantially planar cap endwall extending across the sidewall at the first end and substantially parallel to the lid, said endwall having at least one pre-filtering porous panel spaced from the gas impermeable lid, thereby forming a second gas pathway extending from openings in the endwall's pre-filtering porous panel through the pores in the filter media strip to the base aperture; and
    iii. wherein the openings in the pre-filtering porous panels are substantially larger than the predetermined pore size of the filter media strip.

16. The filter in accordance with claim 15, wherein the second gas pathway extends through a gap formed between the lid and the cap endwall.

17. The filter in accordance with claim 16, wherein the pre-filtering porous panels comprise screens with mesh size of about 38 openings per square inch.

18. The filter in accordance with claim 16, wherein the filter media strip is pleated.

19. The filter in accordance with claim 18, wherein the cap sidewall's pre-filtering panel is transverse to the endwall's pre-filtering panel.

20. A filter for removing particulate from a gas stream flowing through a dirt collecting chamber of a vacuum cleaner, the filter comprising:
  a) a substantially gas-impermeable base having an aperture through which the gas stream can flow, said aperture having an axis;
  b) a filter media strip having opposing first and second lateral edges, the first lateral edge sealingly mounted to and curved around the base aperture, thereby forming an outwardly facing, substantially cylindrical surface on the filter media strip having an axis that is substantially coaxial with the aperture axis, said filter media having a predetermined "pore size" for permitting the gas stream to flow through;
  c) a substantially gas impermeable lid sealingly mounted to the second lateral edge of the filter media strip and spaced from the base with the filter media strip interposed between the lid and the base for permitting the gas stream to flow through the filter media strip and then through the base aperture; and
  d) a cap sealingly mounted to the base and extending over the filter media strip and the lid, the cap comprising:
    i. a substantially cylindrical sidewall substantially coaxial with the filter media strip, the sidewall having a first end and an opposite second end mounted to the base, the sidewall also having at least one pre-filtering porous panel spaced from the outwardly facing surface of the filter media strip, thereby forming a first gas pathway from openings formed in the sidewall's pre-filtering porous panel through the pores formed in the filter media strip to the base aperture;
    ii. a substantially planar cap endwall extending across the sidewall at the first end and substantially parallel to the lid, said endwall having at least one pre-filtering porous panel spaced from the gas impermeable lid, thereby forming a second gas pathway extending from openings in the endwall's pre-filtering porous panel through the pores in the filter media strip to the base aperture; and
    iii. wherein the openings in the pre-filtering porous panels are substantially larger than the predetermined pore size of the filter media strip.

21. The filter in accordance with claim 20, wherein the second gas pathway extends through a gap formed between the lid and the cap endwall.

22. The filter in accordance with claim 21, wherein the pre-filtering porous panels comprise screens with mesh size of about 38 openings per square inch.

23. The filter in accordance with claim 21, wherein the filter media strip is pleated.

24. The filter in accordance with claim 23, wherein the cap sidewall's pre-filtering panel is substantially perpendicular to the endwall's pre-filtering panel.

* * * * *